(12) United States Patent
McWilliams

(10) Patent No.: US 9,085,331 B1
(45) Date of Patent: Jul. 21, 2015

(54) TEARDROP SEMI END DUMP TRAILER

(71) Applicant: Clifford O. McWilliams, Owasso, OK (US)

(72) Inventor: Clifford O. McWilliams, Owasso, OK (US)

( * ) Notice: Subject to any disclaimer, the term of this patent is extended or adjusted under 35 U.S.C. 154(b) by 0 days.

(21) Appl. No.: 14/471,467

(22) Filed: Aug. 28, 2014

(51) Int. Cl.
*B62D 35/00* (2006.01)
*B62D 33/02* (2006.01)
*B60P 1/28* (2006.01)

(52) U.S. Cl.
CPC ............... *B62D 33/02* (2013.01); *B60P 1/286* (2013.01)

(58) Field of Classification Search
CPC .................. B62D 35/00; B62D 35/001
USPC .......... 296/180.1, 180.4, 181.4, 181.5, 183.1, 296/183.2; D12/101, 102, 105
See application file for complete search history.

(56) References Cited

U.S. PATENT DOCUMENTS

| | | | |
|---|---|---|---|
| 1,627,336 A | 11/1926 | Nelson | |
| 1,883,936 A * | 10/1932 | Kerr | 296/183.2 |
| D132,903 S | 12/1940 | Biszantz | |
| 3,094,351 A | 4/1956 | Gwinn, Jr. | |
| 2,888,297 A * | 5/1959 | Ridgway | 296/182.1 |
| D187,020 S | 1/1960 | Hockensmith, Jr. | |
| 3,306,654 A * | 2/1967 | Curcio | 296/183.1 |
| 3,729,230 A | 4/1973 | Tomlinson, Jr. et al. | |
| 3,844,616 A * | 10/1974 | Acker | 298/10 |
| 4,252,067 A * | 2/1981 | Stark | 105/406.1 |
| 4,269,444 A * | 5/1981 | Emory | 296/181.5 |
| D289,748 S | 5/1987 | Proeschl | |
| 4,883,321 A | 11/1989 | Voigt | |
| 5,083,826 A | 1/1992 | McCrary | |
| 5,454,067 A * | 9/1995 | Tsai | 358/1.6 |
| 5,460,431 A * | 10/1995 | McWilliams | 298/22 AE |
| D390,166 S * | 2/1998 | Kass et al. | D12/102 |
| D403,651 S * | 1/1999 | Reiter | D12/221 |
| D431,498 S * | 10/2000 | Smith et al. | D12/93 |
| 6,539,631 B1 | 4/2003 | McWilliams | |
| 6,637,808 B1 * | 10/2003 | Ling et al. | 296/183.2 |
| 6,688,673 B2 * | 2/2004 | Kloepfer | 296/181.1 |
| 7,232,189 B2 | 6/2007 | Covington et al. | |
| D606,565 S | 12/2009 | Hickenbottom | |
| 7,992,943 B2 | 8/2011 | Westner | |
| D654,096 S | 2/2012 | Hall | |
| 8,550,542 B1 * | 10/2013 | Booher et al. | 296/183.1 |
| 2002/0063442 A1 * | 5/2002 | Voas | 296/181 |
| 2002/0180240 A1 * | 12/2002 | Fujan et al. | 296/184 |
| 2002/0180241 A1 * | 12/2002 | Fujan et al. | 296/184 |

(Continued)

OTHER PUBLICATIONS

PT United Tractors Pandu Engineering, "Rear Dump Tipper Semi Trailer"; http://www.patria.co.id/?act=products&show=c_43f546bdcdfe9&do=p_444378cef1621; May 18, 2012.

(Continued)

*Primary Examiner* — Gregory Blankenship
(74) *Attorney, Agent, or Firm* — Head, Johnson & Kachigian, P.C.

(57) ABSTRACT

A trailer for a dumping vehicle, the trailer comprising: a front end, where the front end is curved; a rear end, where the rear end is narrower than the front end; a bottom floor extending between the front end and the rear end; and a pair of opposed sidewalls extending between the front end and the rear end. The sidewalls may be taller at the front end than at the rear end, may arch uniformly from the front end to the rear end, and may arch uniformly from the top to the bottom. The trailer may further comprise a top rail with an oval cross section.

9 Claims, 4 Drawing Sheets

(56) References Cited

U.S. PATENT DOCUMENTS

| | | | |
|---|---|---|---|
| 2004/0183334 A1* | 9/2004 | Bibeau | 296/183.2 |
| 2007/0080561 A1* | 4/2007 | Lemmons | 296/182.1 |
| 2007/0182208 A1* | 8/2007 | D'Amico et al. | 296/183.1 |
| 2008/0018135 A1* | 1/2008 | Risner | 296/183.2 |
| 2014/0183904 A1* | 7/2014 | Moon et al. | 296/183.2 |
| 2015/0035314 A1* | 2/2015 | Kibler | 296/183.2 |

OTHER PUBLICATIONS

Heavy Equipment Guide, "Dump Trailer with U-frame and curved corners"; http://heg.baumpub.com/products/8977/dump-trailer-with-u-frame-and-curved-corners; May 18, 2012.

* cited by examiner

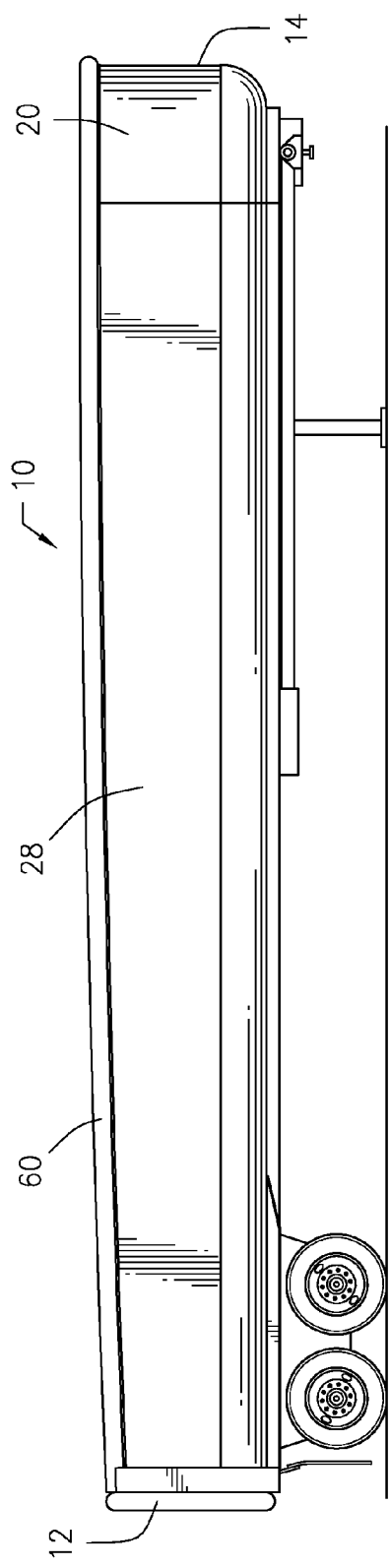
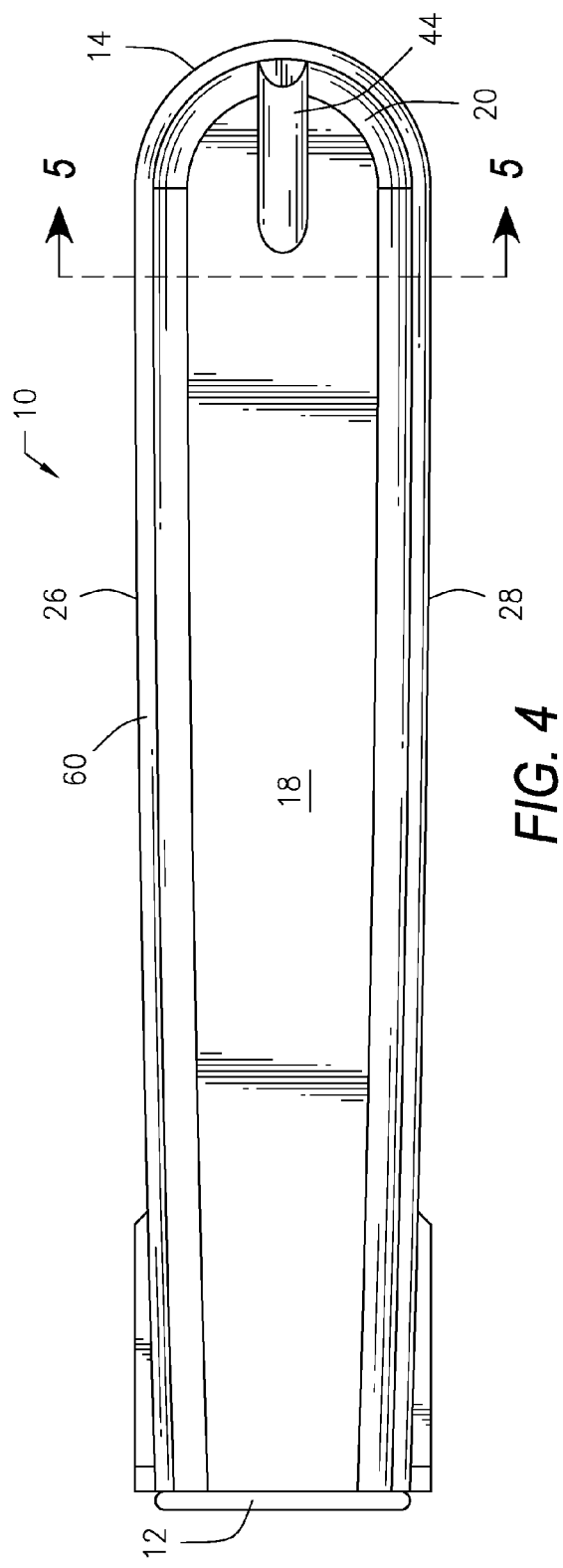
FIG. 3
FIG. 4

TEARDROP SEMI END DUMP TRAILER

BACKGROUND OF THE INVENTION

1. Cross Reference

Not Applicable.

2. Field of the Invention

This invention relates generally to an end dump trailer, and more particularly, but not by way of limitation, to an end dump trailer with a teardrop shape.

3. Description of the Related Art

Trailers used to transport loads which may be tilted by raising the front end and dumping the contents out of the rear end by force of gravity are well known. These trailers are typically attached to trucks or other vehicles to haul the trailer and accompanying load. The trailer itself includes a front wall and sidewalls and may have a removable or swinging tail gate. The tail gate is closed during loading and transportation of the materials and is removed or opened to unload the materials.

During loading and transportation of the materials, the trailer is parallel with the ground. During unloading, the trailer is tilted so that the force of gravity will allow the materials to slide out of the rear.

Such trailers are typically transported from place to place via public roads, including highways, often at high rates of speed. Thus, the aerodynamic properties of the trailer are important.

Based on the foregoing, it is desirable to provide an end dump trailer with good aerodynamic properties.

SUMMARY OF THE INVENTION

In general, in a first aspect, the invention relates to a trailer for a dumping vehicle, the trailer comprising: a front end, where the front end is curved; a rear end, where the rear end is narrower than the front end; a bottom floor extending between the front end and the rear end; and a pair of opposed sidewalls extending between the front end and the rear end, where the sidewalls are taller at the front end than at the rear end.

The front end may be semicylindrical. The bottom floor may have a center section and two side sections and the center section may be flat. The two side sections may curve upward from the center section to the pair of opposed sidewalls and may connect to the pair of opposed sidewalls.

The sidewalls may slope downward from the front end to the rear end at a constant rate. Additionally or alternately, the sidewalls may slope inward from the front end to the rear end at a constant rate. Alternately, the sidewalls may arch uniformly from the front end to the rear end and/or from the top to the bottom. The trailer may further comprise a top rail atop the sidewalls and front end, where the top rail may have an oval cross section.

BRIEF DESCRIPTION OF THE DRAWINGS

FIG. 3 is a side view of the trailer;

FIG. 4 is a top view of the trailer; and

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
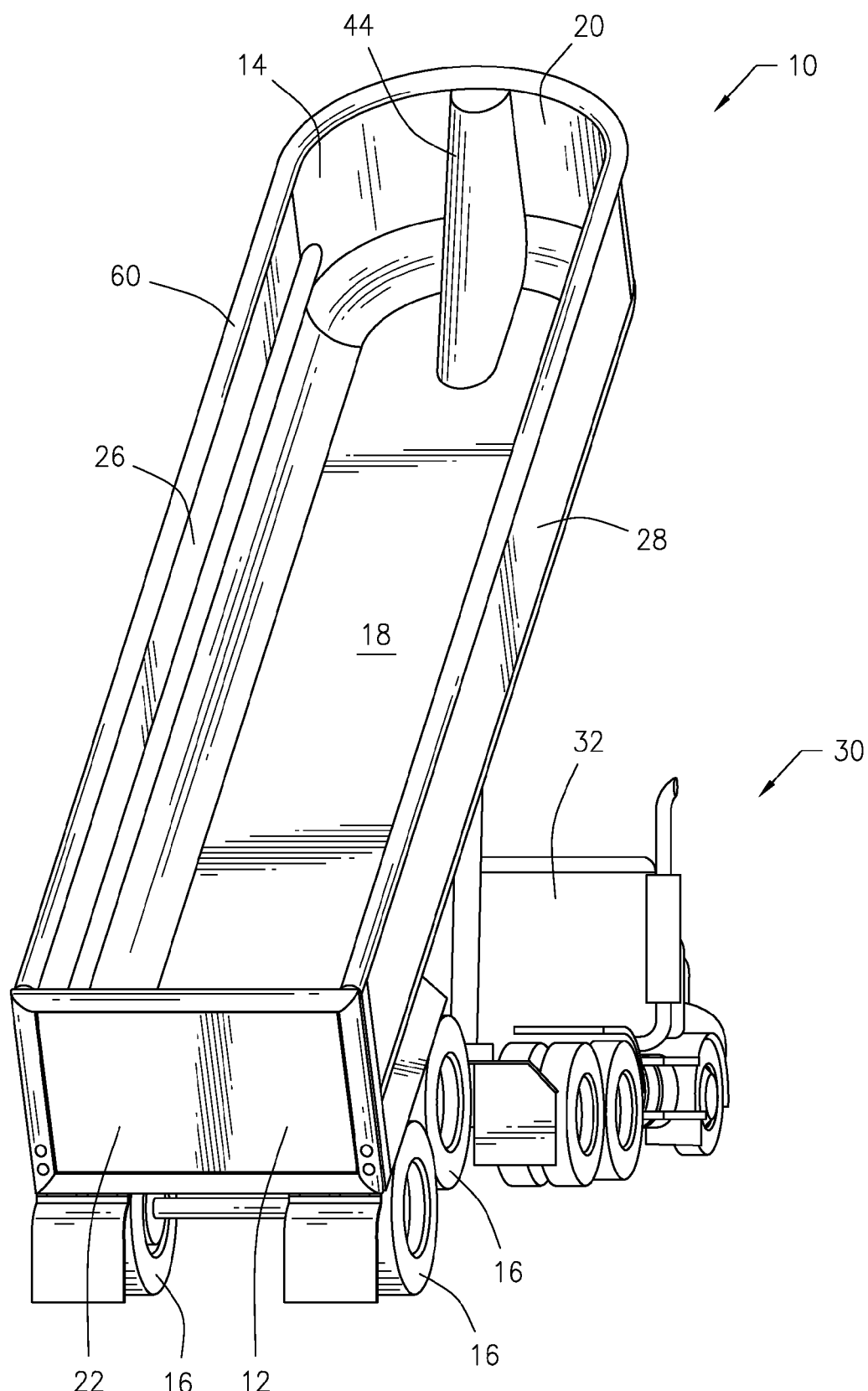
FIG. 1 is a perspective view of the trailer in a raised or lifted position.

In general, in a first aspect, the invention relates to an end dump trailer 10. FIG. 1 is a perspective view of the trailer 10 shown from behind the rear end 12 of the trailer. The trailer 10, shown unloaded, may be capable of holding and transporting a wide variety of materials. The trailer 10 may have particular application for loose materials, such as clay materials, sand, limestone, gravel, and stone. The trailer 10 may be built to various dimensions. In one embodiment, the trailer 10 has a cubic capacity of up to 49 yards and has a rated carrying capacity of up to 80,000 pounds. The trailer 10 may be constructed of aluminum alloy, steel, or other sturdy materials.

Opposed to the rear end 12 of the trailer 10 is a front end 14. The front end 14 may be generally curved. Specifically, the front end 14 may form a semicylinder. The trailer 10 may be supported at its rear end 12 by a plurality of rear wheels 16. A single pair of wheels may be utilized or multiple pairs of wheels may be provided. As will be appreciated from the discussion herein, the axle of one pair of the rear wheels 16 may serve as the transverse axis about which the trailer 10 is lifted and tilted.

During loading of the trailer 10 and during transportation of the materials, the trailer 10 may be substantially parallel to the ground. In FIG. 1, the trailer 10 is empty but has been illustrated in the lifted or raised position wherein the trailer is in angular relation to the ground.

The trailer 10 may include a bottom floor 18 supporting the load of materials to be placed in the trailer. The trailer 10 may also include a front wall 20 extending upward from the bottom floor 18. Opposed to the front wall 20 may be a rear tail gate 22 extending from the bottom floor 18. In FIG. 1, the tail gate 22 is in a closed position. The rear tail gate 22 may remain in the closed position during loading or transportation of materials. While it may be possible to remove the tail gate 22 to unload the materials, the tail gate 22 may be hinged to the trailer 10 at the top of the sides so that the tail gate 22 will swing open for unloading.

The trailer 10 may also include a pair of opposed sidewalls 26 and 28. Each sidewall 26 and 28 may extend upward from the bottom floor 18 of the trailer. Accordingly, the bottom floor 18, the front wall 20, the rear tail gate 22, and the sidewalls 26 and 28 may form an open top container for the receipt of the materials to be transported.

Figure 2:
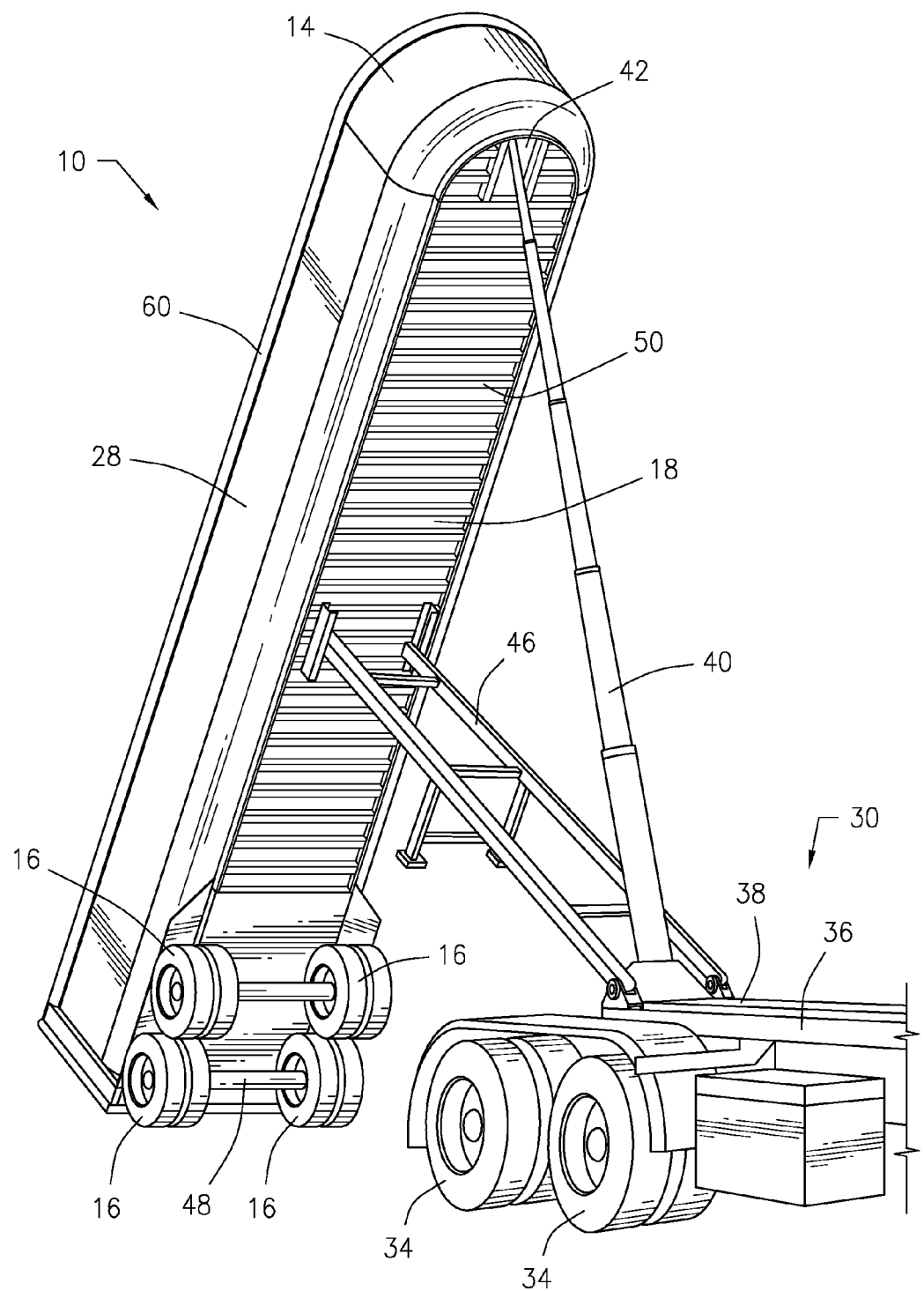
FIG. 2 is a perspective view of the trailer from a different perspective.

FIG. 2 illustrates the trailer 10 as shown in FIG. 1 from a different perspective. With the trailer 10 in the raised or lifted position, the front end 14 of the trailer may be normally supported by a truck 30 during the loading and transporting position. With reference to FIG. 2 and continuing reference to FIG. 1, the truck 30 may include a truck cab 32 and wheels 34 that support a frame 36 and a coupler 38 to connect to the trailer 10.

The truck 30 may include a lifting mechanism having a hydraulic telescoping cylinder 40, which may be operated by controls (not shown) on the truck 30. The bottom floor 18 may contain a recess 42 near the front end 12 to receive the top of the cylinder 40. The recess 42 in the bottom floor may have a corresponding enclosure or hoist box 44. While the recess 42 may not be necessary for a hydraulic lift, this configuration is widely used to provide adequate space for the cylinder 40 when in the closed position.

For stability, a pair of lift arms 46 may extend between the hoist and coupler 38 of the truck 30 and the bottom floor 18. The lift arms 46 may be pivotally connected to both the frame 36 and the bottom floor 18 to accommodate the lifting and lowering of the trailer.

During lifting and lowering, the trailer 10 may tilt about the rear axle 48 of the rear wheels 16, which forms a transverse axis.

The bottom floor 18 may be provided with a series of cross-braces 50 for added strength and stability.

FIG. 3 is a side view and FIG. 4 is a top view of the trailer 10 apart from the truck 30. The bottom floor 18 may not be in a rectangular shape. Rather the bottom floor 18 may be tapered between the front end 14 and the rear end 12 such that the bottom floor is wider at the front end 14 than at the rear end 12. Stated another way, the bottom floor 18 may be wider at the front end 14 and tapers gradually to a narrower floor at the rear end 12. Similarly, the sidewalls 26 and 28 may taper between the front end 14 and the rear end 12 such that the sidewalls 26 and 28 are taller at the front end 14 than at the rear end 12. Stated another way, the sidewalls 26 and 28 may be taller at the front end 14 and taper gradually to a shorter height at the rear end 12. Alternately, the sidewalls 26 and 28 may arch uniformly from the front end 14 to the rear end 12.

Figure 5:
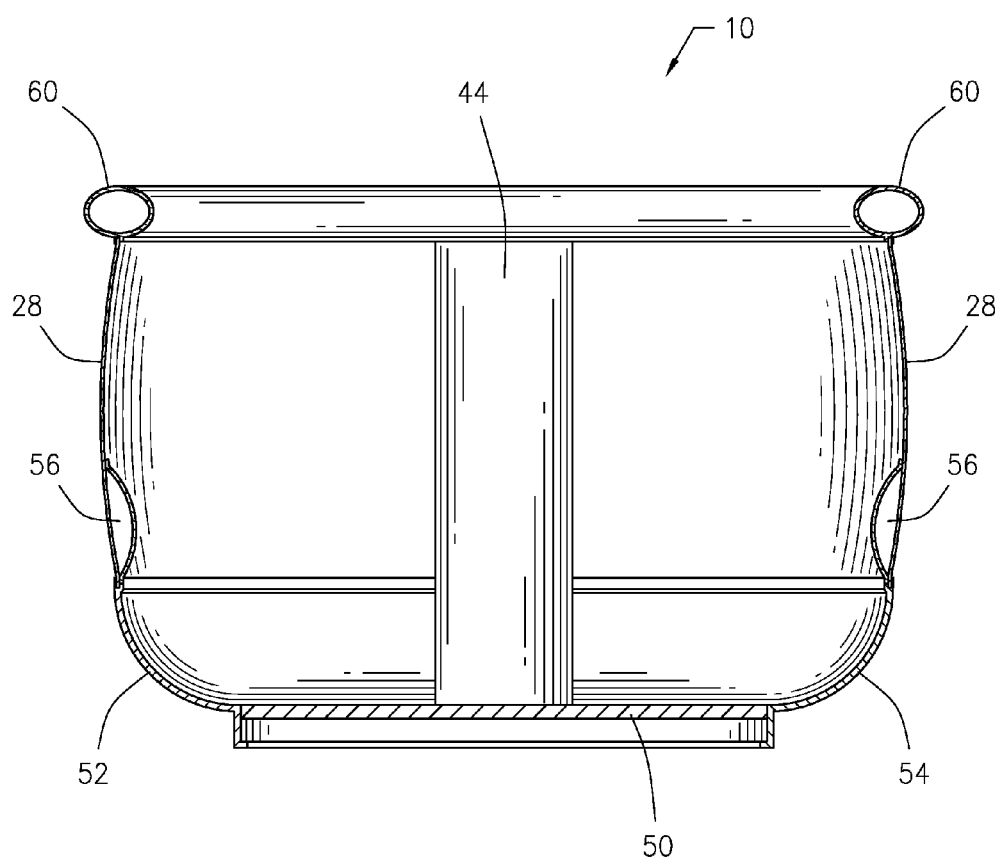
FIG. 5 is a cross section view of the trailer.

FIG. 5 is a sectional view taken along section lien 5-5 of FIG. 4. The bottom floor 18 may have a generally flat center section 50 and generally curved side sections 52 and 54, where side section 52 curves upward from center section 50 to sidewall 26 and side section 54 curves upward from center section 50 to sidewall 28. Sidewalls 26 and 28 may be generally perpendicular to center section 50 of the bottom floor 18. Alternately, sidewalls 26 and 28 may arch uniformly upward from the side sections 52 and 54. The sidewalls 26 and 28 may each have external ribs 56 for added stability, where the sidewalls 26 and 28 deform inward around the ribs 56 such that the ribs 56 are flush with the exterior of the sidewalls 26 and 28, thus reducing drag on the trailer 10.

The trailer 10 may have a top rail 60, which may sit atop the sidewalls 26 and 28 and the front end 14. The top rail 60 may have an oval cross section, as shown in FIG. 5. The top rail 60 may be hollow, and may be formed through extrusion and bending.

To unload the trailer 10, the truck 30 and trailer 10 may be moved to a desired site so that the rear end 12 is aligned with the desired location. The tail gate 22 may then be unlocked and the trailer 10 may be lifted.

Whereas, the devices and methods have been described in relation to the drawings and claims, it should be understood that other and further modifications, apart from those shown or suggested herein, may be made within the spirit and scope of this invention.

What is claimed is:

1. A trailer for a dumping vehicle, the trailer comprising:
a front end, where the front end is curved and semicylindrical;
a rear end, where the rear end is narrower than the front end;
a bottom floor extending between the front end and the rear end; and
a pair of opposed sidewalls extending between the front end and the rear end, where the sidewalls are taller at the front end than at the rear end.

2. The trailer of claim 1 where the bottom floor has a center section and two side sections and where the center section is flat.

3. The trailer of claim 2 where the two side sections curve upward from the center section to the pair of opposed sidewalls.

4. The trailer of claim 3 where the two side sections are connected to the pair of opposed sidewalls.

5. A trailer for a dumping vehicle, the trailer comprising:
a front end, where the front end is curved;
a rear end, where the rear end is narrower than the front end;
a bottom floor extending between the front end and the rear end; and
a pair of opposed sidewalls extending between the front end and the rear end, where the sidewalk are taller at the front end than at the rear end and where the sidewalls slope inward from the front end to the rear end at a constant rate.

6. A trailer for a dumping vehicle, the trailer comprising:
a front end, where the front end is curved;
a rear end, where the rear end is narrower than the front end;
a bottom floor extending between the front end and the rear end; and
a pair of opposed sidewalls extending between the front end and the rear end, where the sidewalls are taller at the front end than at the rear end and where the sidewalls arch uniformly from the front end to the rear end.

7. A trailer for a dumping vehicle the trailer comprising:
a front end, where the front end is curved;
a rear end, where the rear end is narrower than the front end;
a bottom floor extending between the front end and the rear end; and
a pair of opposed sidewalls extending between the front end and the rear end, where the sidewalls are taller at the front end than at the rear end and where the sidewalls have a top and a bottom, where the sidewalls arch uniformly from the top to the bottom.

8. A trailer for a dumping vehicle, the trailer comprising:
a front end, where the front end is curved;
a rear end, where the rear end is narrower than the front end;
a bottom floor extending between the front end and the rear end;
a pair of opposed sidewalls extending between the front end and the rear end, where the sidewalls are taller at the front end than at the rear end; and
a top rail atop the sidewalls and front end, where the top rail has an oval cross section.

9. A trailer for a dumping vehicle, the trailer comprising:
a front end, where the front end is curved;
a rear end, where the rear end is narrower than the front end;
a bottom floor extending between the front end and the rear end;
a pair of opposed sidewalls extending between the front end and the rear end, where the sidewalls:
are taller at the front end than at the rear end;
arch uniformly from the front end to the rear end; and
have a top and a bottom and arch uniformly from the top to the bottom; and
a top rail atop the sidewalls and front end, where the top rail has an oval cross section.

* * * * *